Figure 1:
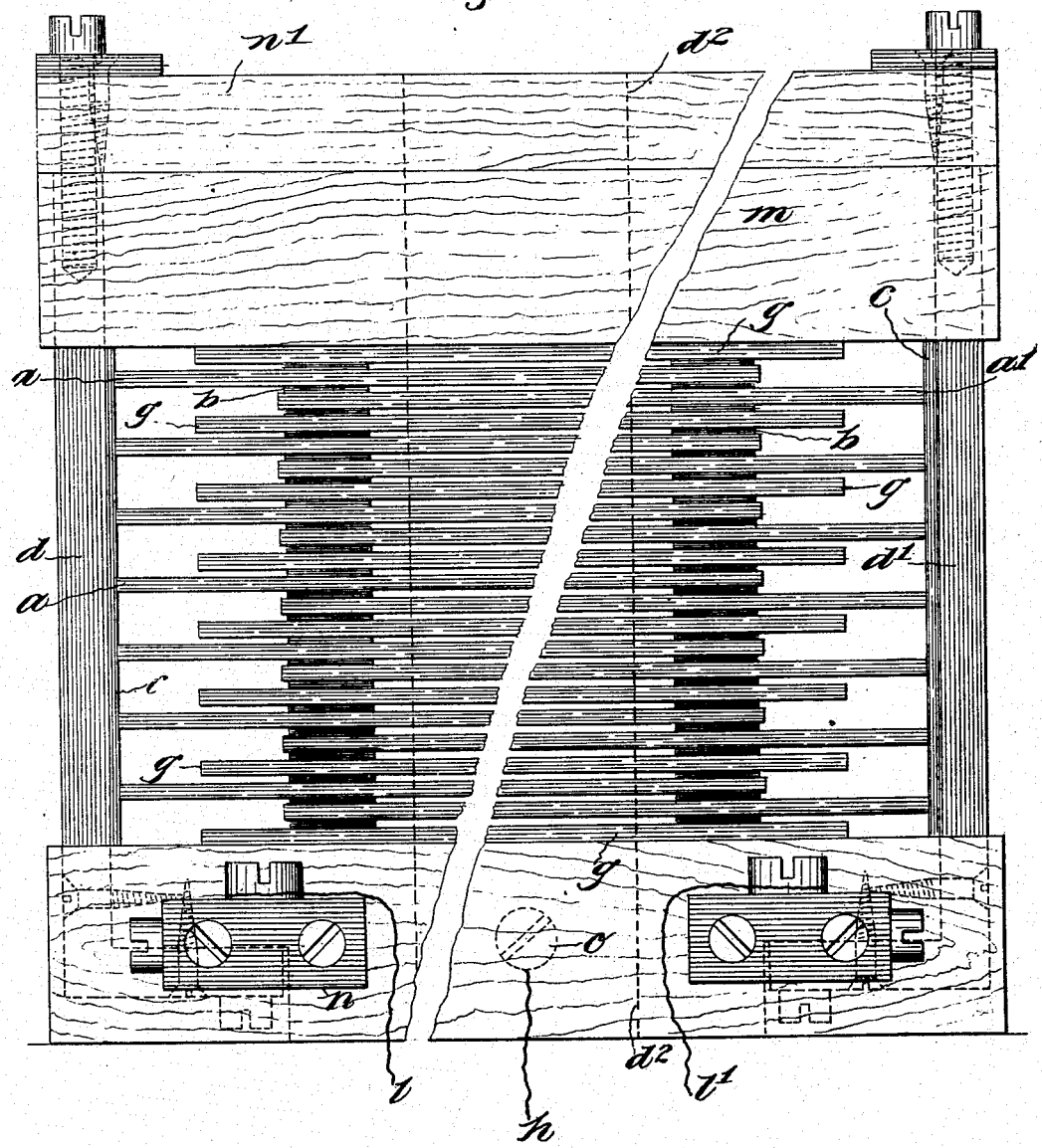

No. 676,185. Patented June 11, 1901.
F. GATTINGER.
LIGHTNING PROTECTOR FOR ELECTRICAL APPARATUS.
(Application filed Mar. 28, 1896.)
(No Model.) 2 Sheets—Sheet 1.

Witnesses,
Inventor.
Franz Gattinger.

No. 676,185. Patented June 11, 1901.
F. GATTINGER.
LIGHTNING PROTECTOR FOR ELECTRICAL APPARATUS.
(Application filed Mar. 28, 1896.)
(No Model.) 2 Sheets—Sheet 2.
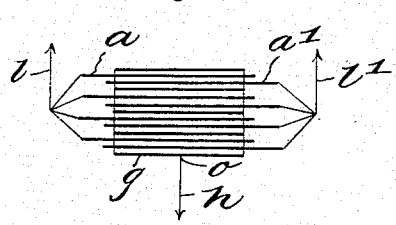
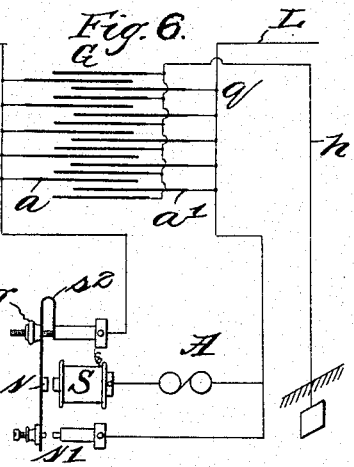
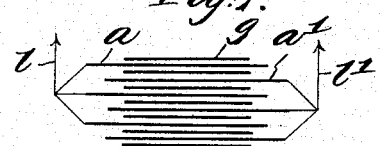
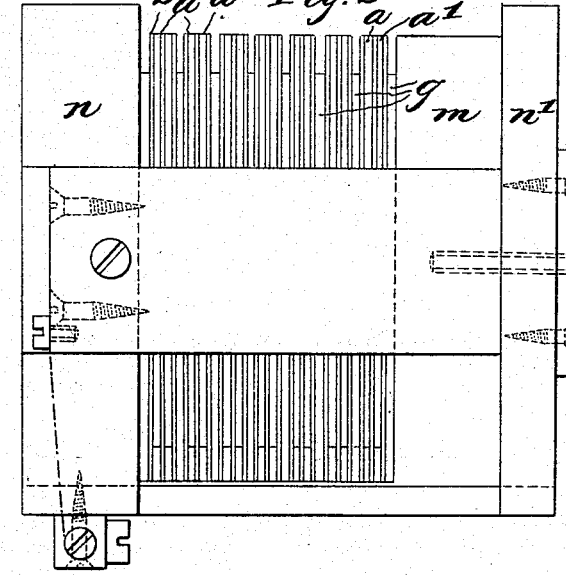
Witnesses
Inventor
Franz Gattinger.
THE NORRIS PETERS CO., PHOTO-LITHO., WASHINGTON, D. C.

UNITED STATES PATENT OFFICE.

FRANZ GATTINGER, OF VIENNA, AUSTRIA-HUNGARY.

LIGHTNING-PROTECTOR FOR ELECTRICAL APPARATUS.

SPECIFICATION forming part of Letters Patent No. 676,185, dated June 11, 1901.

Application filed March 28, 1896. Serial No. 585,231. (No model.)

*To all whom it may concern:*

Be it known that I, FRANZ GATTINGER, a subject of the Emperor of Austria-Hungary, residing at Vienna, in the Province of Lower Austria, in the Empire of Austria-Hungary, have invented certain new and useful Improvements in Lightning-Protectors for Electrical Apparatus; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has relation to lightning-protectors for electrically-operated apparatus or appliances—such as telegraph, telephone, signaling, and other appliances of the kind—and is more especially adapted for use in and for the protection of apparatus or appliances operated by currents of low potential, such as above enumerated, although I do not desire to limit it to use in conjunction with such apparatus or appliances exclusively.

The protection afforded to electrically-operated apparatus by the lightning-protectors hitherto employed is not sufficient under all circumstances, as is well known to electricians, and the causes thereof are also well known, as well as the fact that during electric storms the function or operation of the apparatus so protected is as a rule interrupted.

My invention has for its object a lightning-protector for electrically-operated apparatuses so organized as to afford practically absolute protection against atmospheric electrical discharges without interfering with the working of the apparatus during the operation of the protector, or, in other words, during an electrical storm, as will now be fully described, reference being had to the accompanying drawings, in which—

Figure 1 is a side elevation of a lightning-protector constructed in accordance with my invention, the contact-plate for the series of grounded carbon conductors being shown in dotted lines; and Fig. 2 is an end elevation thereof. Fig. 3 is a diagram illustrating the connections between the elements of the protector, the line, and the ground, respectively. Figs. 4 and 5 are similar views illustrating a modified arrangement of the aforesaid connections, and Fig. 6 is also a diagram illustrating an automatic cut-out interposed in the connections between the lightning-protector and the apparatus to be protected.

My improved lightning-protector consists, essentially, of three series of carbon plates $a$, $a'$, and $g$. The series of plates $a$ and $a'$ I may term "collectors" or "receivers," in that they are directly connected with the line or feeder terminals $l\, l'$, leading, respectively, to and from the apparatus to be protected, while the series of carbon plates $g$ I may term the "discharging-plates," in that they are grounded and receive current from the collecting-plates, so as to discharge the high-potential currents as fast as collected by the plates $a\, a'$, leaving the line open to the working currents of low potential to operate the protected apparatus.

The arrangement of the plates $a$, $a'$, and $g$ is such that a plate $g$ is interposed between a pair of collecting-plates $a\, a'$, and to facilitate the connection in series of the several sets of plates they are preferably so arranged that the plates $a$ will overlap or project beyond the plates $a'$ at one end of the apparatus, while said plates $a'$ will overlap or project beyond plates $a$ at the opposite end of the apparatus, so that vertical conductive bars $d$ and $d'$ can be conveniently connected with the ends of the series of plates $a$ and $a'$, respectively, as shown in Fig. 1, said vertical bars being respectively connected through suitable binding posts or clamps with the line-terminals $l$ and $l'$, leading to and from the apparatus A to be protected, Fig. 6.

The discharge-plates $g$ are so arranged relatively to the collecting-plates $a$ and $a'$ as to overlap or project beyond one side of the series of plates $a$ and $a'$, so that a single vertical conductive bar $d^2$ (shown in dotted lines in Fig. 1, in full lines in Fig. 2, and diagrammatically in Fig. 6) may be employed, said bar $d^2$ being suitably grounded, as by wire $h$, Fig. 6.

In practice and to provide a more reliable connection between the three series of carbon plates and their respective conductive bars I preferably interpose a good conductor—such as a metallic foil, for instance—between the plate ends and their respective conductive bars. It is obvious, however, that conductive rods may be employed on which the several series of carbon plates may be mounted—that is to say, the projecting ends of the carbon plates may have perforations for the passage of the rods. On the other hand, a discharge-plate $g$ may be arranged between each two collecting or receiving plates $a$ and $a'$ instead of between two couples of such, as shown in Figs. 3 and 4, or, as shown in Fig. 5, but a single discharge-plate $g$, placed in contact with the ends or sides of the series of collecting or receiving plates $a$ and $a'$, may be used.

Whatever the arrangement of the plates $a$, $a'$, and $g$ may be they must be suitably spaced from one another, and this may be done by narrow strips of insulating material, preferably an incombustible material, as narrow strips of mica $b$.

The stack of plates $a$, $a'$, and $g$, arranged relatively to one another, as specified, is mounted in a suitable non-conductive framing comprising base and top plates $m$ and $n$ $n'$, Figs. 1 and 2, to which the connecting-bars $d$, $d'$, and $d^2$ are secured by means of screws, as shown in dotted lines in said Fig. 1. Finally, the supporting-frame is provided with suitable screw-clamps or binding-posts for connecting the line-terminals $l$ and $l'$ and the ground-wire $h$ with the conductive bars $d$, $d'$, and $d^2$, respectively.

It is well known that it is practically impossible to obtain by molding a carbon plate having perfectly smooth surfaces. In the preparation of my carbon plates from pulverized carbon I endeavor to obtain plates having rather rough surfaces. The more or less rough-surfaced plates when juxtaposited present to one another innumerable points, forming as many point collectors and transmitters, and by providing a suitable number of plates of the required superficial area for each series of such plates I obtain a protector capable of receiving and discharging or conducting to earth all such static charges which would otherwise destroy the apparatus protected thereby without interfering with the passage of the working current through the line and hence without interfering with the working of said apparatus during atmospheric disturbances.

In the construction of my improved lightning-protector the number of collecting-plates $a$ and $a'$ relatively to the number of discharge-plates $g$, their superficial areas, and the distances between them are dependent upon the capacity—i. e., the cross-sectional area—of the line wire or feeder. Hence these factors will vary in accordance with the capacity of the line or feeder in order that the latter may be relieved of maximum static charges.

An idea may be formed of the capacity of a lightning-protector constructed in accordance with my invention from the following: In a protector each of the three series of which consists of ten carbon plates ten by fourteen, suitably spaced—say from one-half to five millimeters—apart, each of said plates will have a superficial area of $2 \times 10 \times 14 = 280$ cm$^2$ and a collective superficial area of $280 \times 30 = 8,400$ cm$^2$. These areas are covered with an infinite number (millions) of collecting and transmitting points, and if the capacity or cross-sectional area of the line wire or feeder is proportionate to this area it becomes evident that said line wire or feeder will be relieved of atmospheric electrical static charges as fast as it becomes charged, said charges being at once conducted to earth. Such an apparatus would efficiently protect a telegraphic or telephonic instrument, for instance, and practice has fully demonstrated this to be the case. Practice has also shown that the described protector will perform the described function even when the line is charged with comparatively small quantities of static electricity, and this is due to the large collecting and discharging areas of the three series of carbon plates $a$, $a'$, and $g$, the former plates $a$ and $a'$ continuously receiving or collecting the charges, while the latter plates $g$ continuously discharge the same—that is, conduct the same to earth. The accumulation of high-potential charges thus becomes impossible, and although the arrangement of the carbon plates is somewhat similar to the arrangement of the plates in condensers it is obvious that my improved lightning-protector does not in any manner perform the function of a condenser. The air-insulation between the plates is insufficient to form a dielectric in view of the fact that opposite faces of the plates act as point-collectors, while the narrow strips $b$ of dielectric material merely perform the function of mechanical separators to properly space the carbon plates and are as small as consistent with the proper spacing of said plates, so as to avoid even a very slight condensation, which would result in a reduction of the efficiency of the apparatus. The latter acts essentially as a point collector or transmitter to conduct disruptive or destructive electric charges from line or feeder to earth.

When the lightning-protector is in operation, there is not the slightest sparking even during the most violent electric atmospheric disturbances, the passage of the static charges being accompanied by more or less audible buzzing or humming sounds only.

From what has been said it will readily be understood that during the operation of the lightning-protector it is not necessary to cut out the apparatus or instrument protected, the operation or function of which may therefore continue during electrical atmospheric disturbances without danger of injury to such protected apparatus or instrument or to the operator. The arrangement of the series of carbon plates as described also admits of the inclusion of a telephone into a telegraphic, signaling, or other like circuit, as the telephonic current impulses are not interfered with by the current of higher potential, and this I accomplish by bridging the multiplying induction-coils in the telegraphic, signaling, or other like circuit with my improved lightning-protector. An automatic cut-out may, however, be used, if desired, whereby the protected apparatus is automatically cut out of the circuit including the protector during electrical atmospheric disturbances. Such a cut-out I have shown in Fig. 6, which in its essential features is of a well-known construction and arrangement. It consists of an electromagnet S included in the connections $p$ and $q$, that connect the two series of carbon plates $a$ and $a'$ of the lightning-protector G with the line or feeder L and in which the apparatus A to be protected is also included, a branch from conductor $q$ being connected with a suitable contact $s'$ in the path of a corresponding contact secured to a spring $s^2$, carrying the armature $s$ of the electro-magnet S, and electrically connected with the conductor $p$, thus providing a short circuit for currents of high potential, such as atmospheric electrical discharges, whereby the apparatus A is automatically cut out at each electrical discharge, electromagnet S being energized and its armature $s$ attracted. This energizing of the electromagnet S will probably take place simultaneously with the energizing of the induction-coil of the apparatus A, and owing to the low resistance of the electromagnet (five to six ohms) its almost inappreciable self-induction and absence of remanence the core will attain its magnetic saturation much more rapidly than the core of the induction-coil of the apparatus A and will therefore attract its armature $s$ much sooner, thus providing a by-path for the high-potential charges. This of course lasts as long as the atmospheric electrical discharges—a few seconds only—so that the operation of the apparatus A will not be interrupted for any length of time. The armature-spring $s^2$ should, however, be arranged so as to depend vertically from its support in order to reduce as much as possible the power required to overcome the inertia of the armature $s$ and render it more sensitive to the influence of the electromagnet S, and consequently more rapid in its operation to close the short circuit.

The tension of the armature-spring $s^2$ is adjustable through the medium of a screw-rod and nut $r$, and the adjustment should be such that the armature will not only be quickly attracted when the electromagnet is energized, but will be as quickly retracted when said magnet is demagnetized.

I have shown the automatic cut-out simply as an additional or auxiliary safety device. I have found by extensive practice that it can be dispensed with.

Having thus described my invention, what I claim as new therein, and desire to secure by Letters Patent, is—

1. A lightning-protector for electric circuits, comprising a number of carbon plates respectively connected in sets and in parallel with opposite terminals of the circuit wire or feeder and with the ground, said carbon plates of such superficial area and so arranged relatively to one another as to conduct to earth without sparking all of the atmospheric electric charges said wire or feeder is capable of taking up, substantially as set forth.

2. A lightning-protector for electric circuits comprising a number of rough-surfaced carbon plates forming innumerable point collectors and transmitters, said plates respectively connected in sets and in parallel with opposite terminals of the circuit wire or feeder and with the earth, said carbon plates of such superficial area and so arranged relatively to one another as to render their opposite faces effective and so as to conduct to earth, without sparking, all of the atmospheric electric charges said wire or feeder is capable of taking up, substantially as set forth.

3. A lightning-protector for electric circuits, comprising two sets of juxtaposited carbon plates, one or more plates of one set alternating with one or more plates of the other set, said sets respectively in parallel with the opposite poles of a source of electricity, and one or more similar grounded plates arranged to take current from both the aforesaid sets of plates, for the purpose set forth.

4. A lightning-protector for electric circuits comprising two sets of carbon plates, one or more plates of one set alternating with one or more plates of the other set, said sets respectively in parallel with the opposite poles of a source of electricity, means for spacing the plates, and one or more similar grounded plates arranged to take current from both the aforesaid sets, for the purpose set forth.

5. A lightning-protector for electric circuits comprising two sets of carbon plates one or more plates of one set alternating with one or more plates of the other set, said sets respectively in parallel with the opposite poles of a source of electricity, dielectric narrow spacing-strips between each two plates, and one or more similar grounded plates arranged to take current from both the aforesaid sets, for the purpose set forth.

6. A lightning-protector for electric circuits comprising two sets of carbon plates, one or more plates of one set alternating with one or more plates of the other set, said sets respectively in parallel with the opposite poles of a source of electricity, thin, narrow, refractory dielectric spacing-strips between each two plates near their opposite ends, and one or more similar grounded plates arranged to take current from both the aforesaid sets, for the purpose set forth.

7. A lightning-protector for electric circuits comprising three sets of juxtaposited carbon plates alternating with one another, one set connected in parallel with one pole of a source of electricity and the other in parallel with the other pole of said source, and the third set in parallel with the earth, for the purpose set forth.

In testimony whereof I affix my signature in presence of two witnesses.

FRANZ GATTINGER.

Witnesses:
 JOSEF ZENETNAN,
 HARRY BELMONT.